(12) United States Patent
Park et al.

(10) Patent No.: US 8,741,148 B2
(45) Date of Patent: Jun. 3, 2014

(54) WATER TREATMENT SYSTEM

(75) Inventors: Stuart Park, Chardon, OH (US);
Stephen Goff, Burton, OH (US); Steven Hoopes, Warren, OH (US); Peter Halemba, Russell, OH (US)

(73) Assignee: Kinetico Incorporated, Newbury, OH (US)

( * ) Notice: Subject to any disclaimer, the term of this patent is extended or adjusted under 35 U.S.C. 154(b) by 611 days.

(21) Appl. No.: 12/747,180

(22) PCT Filed: Dec. 12, 2008

(86) PCT No.: PCT/US2008/086608
§ 371 (c)(1),
(2), (4) Date: Sep. 8, 2010

(87) PCT Pub. No.: WO2009/076606
PCT Pub. Date: Jun. 18, 2009

(65) Prior Publication Data
US 2010/0326917 A1    Dec. 30, 2010

Related U.S. Application Data

(60) Provisional application No. 61/007,462, filed on Dec. 13, 2007.

(51) Int. Cl.
*B01D 61/00* (2006.01)
*B01D 63/00* (2006.01)
*C02F 1/44* (2006.01)

(52) U.S. Cl.
CPC .................................... *B01D 61/00* (2013.01)
USPC ........ 210/652; 210/257.2; 210/134; 210/136; 210/90; 210/106; 210/416.2

(58) Field of Classification Search
CPC .............. C02F 9/00; C02F 1/44; B01D 61/00
USPC ............ 210/652, 257.2, 195.1, 134, 136, 90, 210/110, 321.69, 106, 141, 195.2
See application file for complete search history.

(56) References Cited

U.S. PATENT DOCUMENTS 3,441,047 A * 4/1969 Lyall et al. .................... 137/343
4,604,194 A * 8/1986 Entingh .......................... 210/98
(Continued)

FOREIGN PATENT DOCUMENTS

WO    WO 03 057998    7/2003
WO    WO 03 106003    12/2003

OTHER PUBLICATIONS

PCT/US2008/088808 International Search Report and Written Opinion; date of mailing Feb. 9, 2009.

*Primary Examiner* — Ana Fortuna
(74) *Attorney, Agent, or Firm* — Tarolli, Sundheim, Covell & Tummino L.L.P.

(57) ABSTRACT

A water treatment system including a reverse osmosis module and a control valve controlling communication between a water source and the module. A feedwater biased storage tank stores permeate and its pressurization by feedwater is controlled by a feedwater control valve. Flow of signal pressure to a signal pressure chamber of the feedwater control valve is restricted to reduce the rate at which a fluid generated force is applied. A check valve in parallel with the restriction allows relatively unrestricted flow out of the signal chamber when signal pressure is terminated. A tank pressurization control valve controls the operation of the feedwater control valve and controls the pressurization of a feedwater biasing chamber in the storage tank. Per-meate is stored in an accumulator for flushing the reverse osmosis module when the storage tank reaches a predetermined limit. Cleaning substances or additives can be introduced into the system.

19 Claims, 6 Drawing Sheets

(56) References Cited

U.S. PATENT DOCUMENTS

| | | | |
|---|---|---|---|
| 4,650,586 A | 3/1987 | Ellis, III | |
| 5,122,265 A * | 6/1992 | Mora et al. | 210/134 |
| 5,628,899 A * | 5/1997 | Vaughan | 210/142 |
| 5,660,720 A | 8/1997 | Walling | |
| 6,068,764 A * | 5/2000 | Chau | 210/136 |
| 6,099,735 A * | 8/2000 | Kelada | 210/652 |
| 6,110,360 A * | 8/2000 | Hart, Jr. | 210/110 |
| 6,436,282 B1 | 8/2002 | Gundrum et al. | |
| 6,764,595 B1 | 7/2004 | Halemba et al. | |
| 6,797,165 B2 * | 9/2004 | Harrison | 210/232 |
| 7,316,774 B2 * | 1/2008 | Halemba et al. | 210/110 |
| 7,513,996 B2 * | 4/2009 | Kloos et al. | 210/257.2 |
| 2003/0196955 A1 | 10/2003 | Hughes | |
| 2004/0238423 A1 * | 12/2004 | Schmitt | 210/137 |
| 2005/0023198 A1 | 2/2005 | Halemba et al. | |
| 2008/0052094 A1 * | 2/2008 | Morfopoulos et al. | 705/1 |

\* cited by examiner

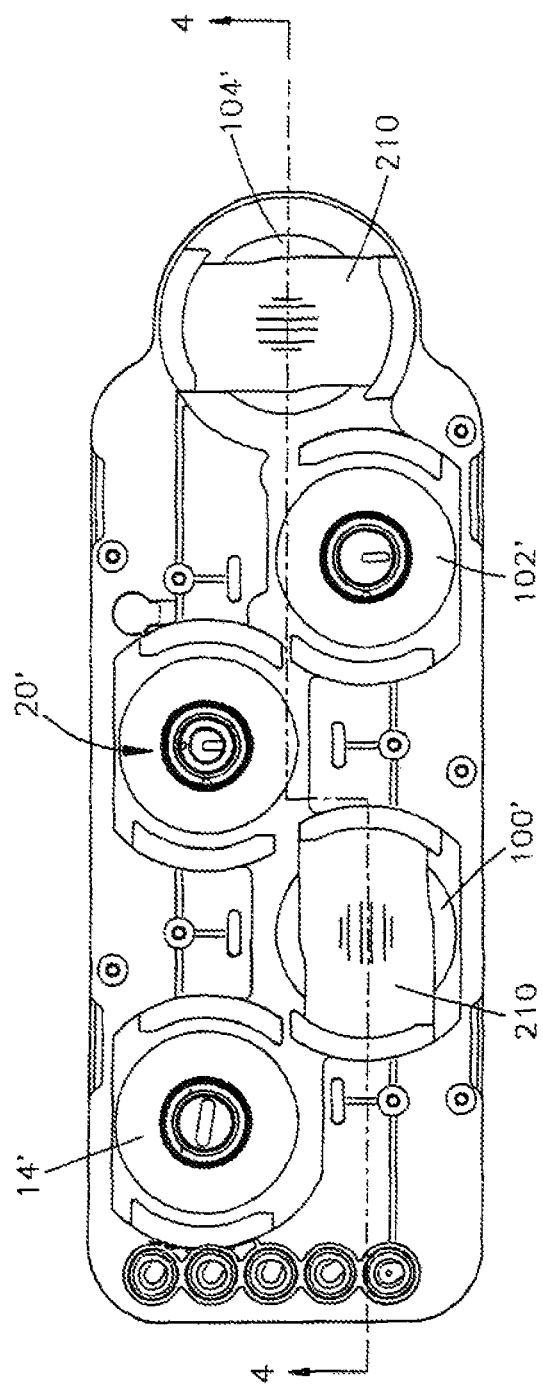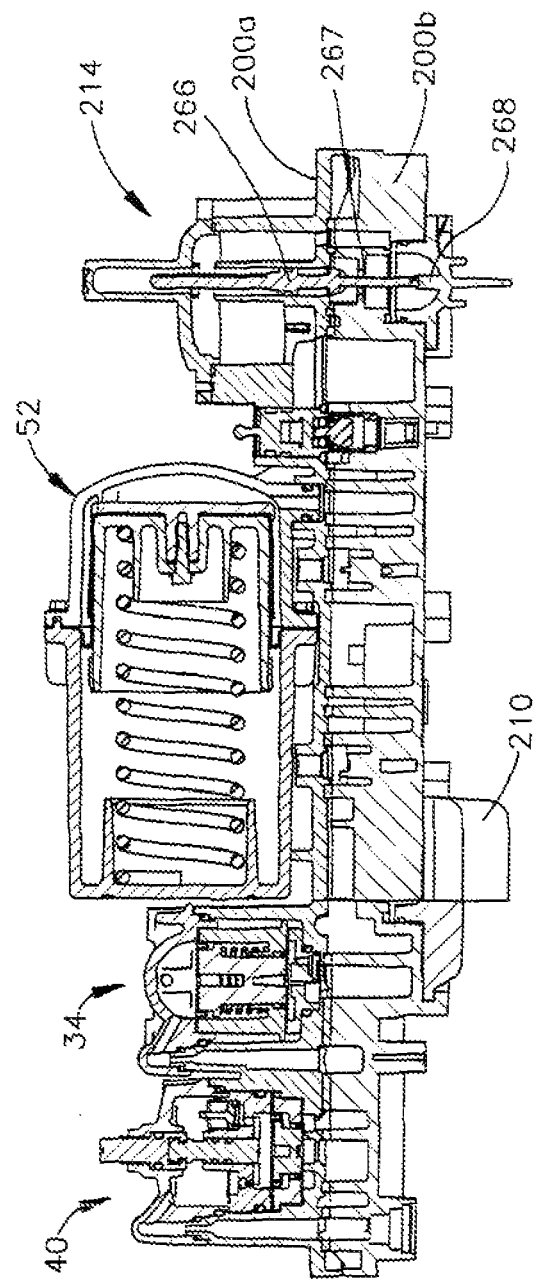

WATER TREATMENT SYSTEM

TECHNICAL FIELD

The present invention relates generally to water treatment and in particular to a reverse osmosis based water treatment apparatus and method.

BACKGROUND ART

On demand drinking water systems are known. In one type of system a reverse osmosis unit is used to treat and subsequently dispense relatively small quantities of treated water. In many currently available systems, the time it takes to fill a glass with the treated water can be unacceptably long. Consumers desire water treatment systems that dispense treated water quickly and which do not rely on external power for their operation.

Reverse osmosis-based water treatment systems that do not require external power are known. An example of such a system is described in U.S. Pat. Nos. 4,650,586 and 6,764,595 which are both owned by the assignee of the present application and which are hereby incorporated by reference. The systems disclosed in these two patents have proven successful. However, consumers desire systems capable of producing and/or dispensing treated water at larger flow rates.

DISCLOSURE OF THE INVENTION

The present invention provides a new and improved water treatment apparatus and method which provides treated water on demand. The system utilizes a reverse osmosis membrane to produce permeate that is stored in a feedwater biased storage tank which is generally depressurized when the system is producing permeate and is only pressurized when permeate is being dispensed by the system or when the tank is full (at the end of a fill cycle). At the conclusion of a permeate producing cycle, the reverse osmosis membrane is flushed with permeate that is stored in a permeate accumulator.

According to the invention, the water treatment system includes a reverse osmosis module having an input for source water to be treated, a permeate output and a concentrate output. A reverse osmosis control valve controls the communication of source water with the reverse osmosis module. A feedwater biased storage tank stores the permeate produced by the reverse osmosis module. A feedwater control valve controls the communication of the source water with a feedwater chamber located in the storage tank. A tank pressurization control valve controls the opening and closing of the feedwater control valve and, hence, controls the pressurization and depressurization of the feedwater chamber in the storage tank.

According to a feature of this embodiment, a restrictor is disclosed for restricting the flow of signal pressure to a signal pressure chamber forming part of the feedwater control valve. The restrictor reduces the rate at which a fluid generated force is applied to a valve operating member forming part of the feedwater control valve.

According to a further aspect of this feature, a check valve is provided that is configured to be in a parallel relationship with the restrictor. The check valve allows a fluid generated force on the valve operating member to be released substantially immediately when the signal pressure is terminated.

According to a further feature of this embodiment, an operating member that is accessible from outside the valve can be operated to mechanically close the feedwater control valve in order to terminate communication of source water with the feedwater biased storage tank. This feature enables a mechanical biased (i.e., gas, spring) storage tank to be substituted for a feedwater biased storage tank.

According to another feature of the invention, the tank pressurization control valve may include a receiving chamber that communicates with a drain. A diaphragm controlled inlet forming part of the tank pressurization valve communicates with the receiving chamber when it is not engaged by a diaphragm. When the diaphragm sealingly engages the inlet, communication of the inlet with the receiving chamber is terminated. According to this feature, a first flow passage including a first restrictor is provided that communicates the feedwater chamber in the storage tank with the drain. A second flow passage including a second flow restrictor is provided that communicates the feedwater chamber in the storage tank with the inlet of the tank pressurization control valve.

According to the illustrated embodiment, the restriction to flow posed by the first flow restrictor is substantially greater than the restriction to flow posed by the second flow restriction. With this arrangement, when the diaphragm seal disengages the inlet, the flow of feedwater to drain via the second passage is substantially greater than the flow of feedwater to the drain via the first passage. In the preferred embodiment, the first passage provides a slight leakage of feedwater to drain throughout the operation of the water treatment system. This improves the reliable operation of the system and, in particular, insures the full depressurization of the feedwater chamber in the storage tank when appropriate.

According to another feature of the invention, a water treatment system is provided that includes a plurality of sockets for receiving removable filter modules. A reservoir/plug is also provided which is receivable by at least one of the sockets whereby a substance can be introduced into the water treatment system for cleaning, treating, etc., the system. According to a further aspect of this feature, an adaptor is also provided that is receivable by at least one of the sockets and which allows additional water treatment, modules to be fluidly connected to the water treatment system.

According to still another feature of the invention, a water treatment system is disclosed that includes a housing for enclosing the components of the water treatment system. In addition, a conduit support is included for isolating forces applied to conduits that are connected to water treatment system components forming part of the water treatment system.

Additional features will become apparent and a fuller understanding obtained by reading the following detail description made in connection with the accompanying drawings.

BRIEF DESCRIPTION OF DRAWINGS

The foregoing and other features of the invention will become more apparent upon a consideration of the following description taken in connection with the accompanying drawings wherein:

FIG. 3 is a bottom view of a housing forming part of the water treatment assembly shown in FIG. 2;

FIG. 4 is a sectional view as seen from the plane indicated by the line 4-4 in FIG. 3;

DESCRIPTION OF SPECIFIC PREFERRED EMBODIMENTS OF THE INVENTION

Figure 1:
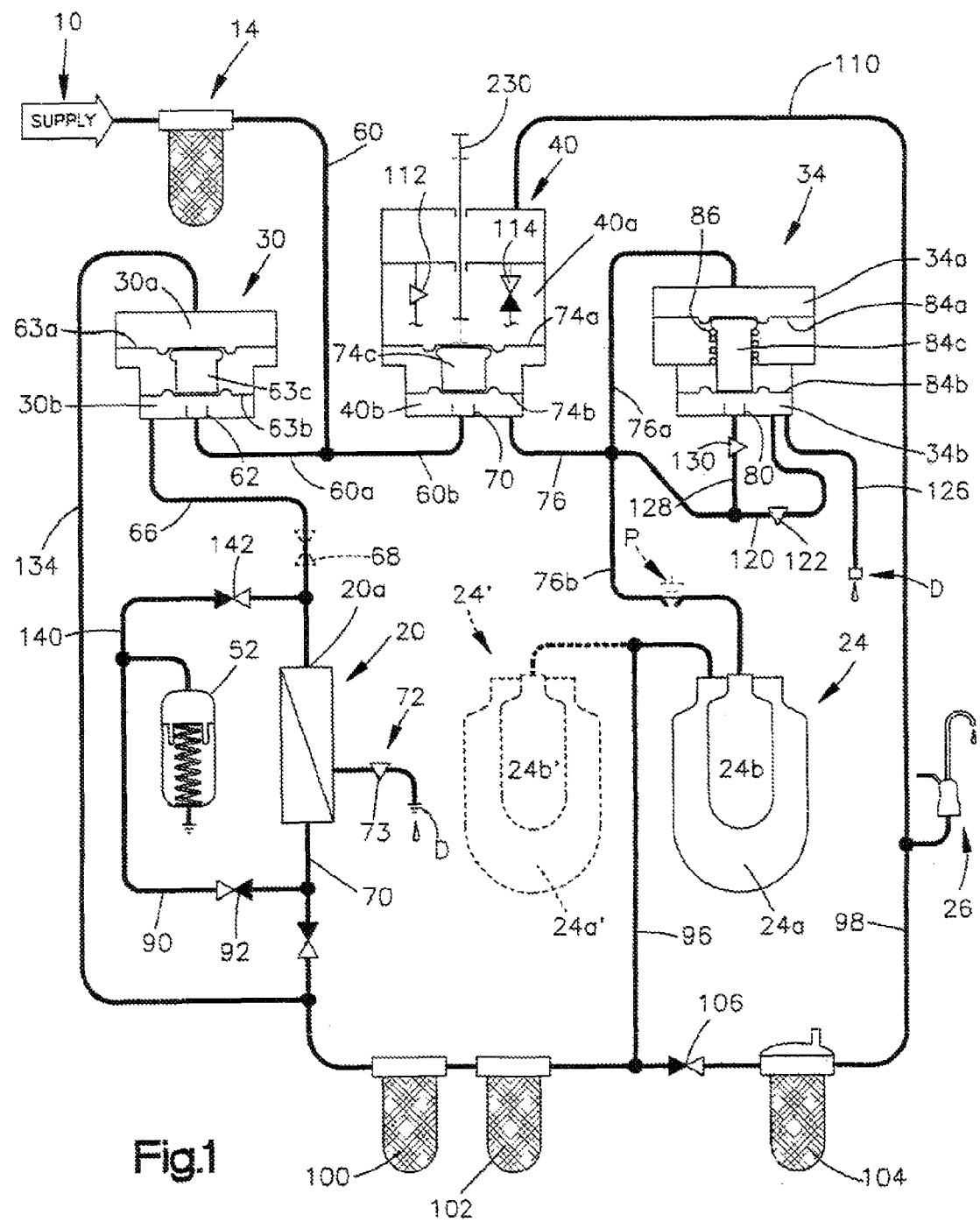
FIG. 1 illustrates schematically a water treatment system constructed in accordance with a preferred embodiment of the invention.

FIG. 1 illustrates schematically, a water treatment system constructed in accordance with a preferred embodiment of the invention. The illustrated system receives water to be treated, from a source indicated generally by the reference character 10. The source may comprise well water or water delivered by a municipal water supply system. The water source is initially filtered by a prefilter 14. The water to be treated is delivered to a reverse osmosis (RO) module 20 which as is known, produces treated water termed "permeate". The permeate is stored in a storage tank 24 from where it is dispensed, on demand, through a faucet 26.

The production of permeate by the RO cartridge 20 is controlled by an RO control valve 30. In the illustrated embodiment the storage tank 24 includes an internal bladder 24b which when pressurized urges permeate out of the storage chamber 24a for delivery to the faucet 26. The pressurization of the bladder 24b is controlled by a tank pressurization (TP) control valve 34. In the illustrated and preferred embodiment, the pressurization of the bladder 24b is achieved using "feedwater". In the illustrated embodiment, the "feedwater" is water from the supply 10. The communication of feedwater to the bladder 24b is controlled by a feedwater (FW) control valve 40.

In general, the water treatment system illustrated in FIG. 1 produces permeate until the tank 24 has received a predetermined amount of permeate or when the permeate in the tank reaches a predetermined pressure. When the tank 24 is "filled", production of permeate is terminated and the RO cartridge 20 is flushed with permeate that is stored in a permeate accumulator 52, as will be described.

At initial start-up the following operational sequence is performed by the system. Water to be treated passes through the prefilter 14 and is delivered to a supply line 60. The supply line 60 has two branches 60a, 60b. The water in branch line 60a enters an inlet port 62 of the RO control valve 30. The communication of the inlet port 62 with a receiving chamber 30b of the valve 30 is controlled by a diaphragm assembly that includes upper and lower co-acting diaphragms 63a, 63b connected together by a piston/coupling member 63c. The RO control valve 30 includes a signal chamber 30a which when pressurized exerts fluid pressure generated forces on the upper diaphragm 63a which urges the diaphragm assembly downwardly. Sufficient downward movement will cause the lower diaphragm to engage and seal the inlet port 62 and inhibit source water from entering the lower chamber 30b. At initial start-up, the signal chamber 30a is depressurized and hence the diaphragm 63b is spaced from the port 62 as shown in FIG. 1. This allows the supply water to flow into a lower chamber 30b of the valve and into an inlet of the RO cartridge 20 via an RO supply conduit 66 (which communicates with the lower chamber 30b). A check valve 68 is located in the supply conduit 66 and allows water to flow from the RO control valve lower chamber 30b into the RO cartridge 20 but inhibits reverse flow. For some applications this check is not needed.

As is known, the RO cartridge 20 separates the incoming water into permeate and concentrate and delivers permeate to an output line 70 and the concentrate to a concentrate discharge line 72 which includes a flow control or restrictor 73. The concentrate is preferably discharged to a drain as schematically illustrated.

It should be noted here, that the diaphragm assembly in the RO control valve 30 reacts to differential pressures. The diaphragm 63a in communication with the signal chamber 30a is preferably of a larger area than the lower diaphragm 63b that is in communication with the lower chamber 30b. This arrangement tends to "amplify" the pressure in the signal chamber 30a so that a closing force is generated by a signal pressure that may be less than the pressure of feedwater in the lower chamber 30b. This "amplification" is determined by the ratio of the areas of the upper and lower diaphragms 63a, 63b.

The feedwater in the branch passage 60b is delivered to the feedwater control valve 40 via an inlet port 70. The feedwater control valve 40 is similar in construction to the RO control valve 30 in that it includes a diaphragm assembly that includes upper and lower diaphragms 74a, 74b joined together by a piston/coupling member 74c. The lower diaphragm 74b is sealingly engageable with the inlet port 70 to inhibit the flow of feedwater into a lower chamber 40b. The chamber 40b communicates with a feedwater supply line 76. When the diaphragm 74b is spaced from the inlet port 70 as shown in FIG. 1, feedwater is delivered to both the bladder 24b and a signal chamber 34a of the tank pressurization control valve 34 via respective feedwater branch passages 76a, 76b.

This incoming feedwater tends to fill and expand the bladder 24b and to enter the signal chamber 34a of the TP valve 34. The TP valve 34 also includes a diaphragm assembly that includes an upper piston 64a and lower diaphragm 84b interconnected by a coupling member 84c. Feedwater in the signal chamber 34a applies a force to the upper piston 84a tending to drive the diaphragm assembly downwardly. Sufficient downward movement will cause the lower diaphragm to sealingly engage an inlet port 80. The TP valve 34 includes a spring 86 which urges the diaphragm assembly upwardly and in effect opposes the force applied by feedwater in the signal chamber 34a. The spring is selected so that a predetermined pressure (i.e., 12 psi) must be generated in the signal chamber 34a before closing occurs. Since feedwater is normally substantially greater than 12 psi (i.e., 60 psi or larger), the communication of feedwater to the signal chamber 34a at initial start-up closes the TP valve 34 (i.e., causes the lower diaphragm 84b to engage and seal the inlet port 80). At startup there is little or no pressure in a lower fluid chamber 34b of the TP valve 34 because a drain D is sized so that any fluid entering the chamber 34b is immediately discharged to the drain. The drain D inhibits fluid entering the chamber 34b from accumulating and fining the chamber. Consequently, there is little or no fluid generated forces exerted on the lower diaphragm 84b to oppose the downward force on the diaphragm assembly.

During this initial start-up the permeate produced by the RO cartridge 20 tends to follow the path of least resistance. Since as described above, the bladder 24b is pressurized and thus expands to fill the entire tank 24, permeate cannot enter the storage chamber 24a. As a consequence, the permeate will tend to flow into the permeate accumulator 52 via accumulator supply line 90 and associated check valve 92. The check valve 92 allows permeate to flow from the permeate supply line 70 to the accumulator supply line 90 but inhibits reverse flow.

The permeate produced by the RO cartridge 20 is delivered to the tank 24 via tank supply line 96. The permeate is also communicated directly to a faucet supply line 98. As seen in FIG. 1, the permeate supply line 70 may include one or more auxiliary filters 100, 102 and the faucet supply line 98 may include a post filter 104. The faucet supply line includes a check valve 106 which allows permeate to flow into the faucet supply line 98 from either the tank supply line 96 or the permeate supply 70 or both but prevents reverse flow. The pressure in the faucet supply line 98 is monitored by a signal line 110 which is connected to a signal pressure chamber 40a forming part of the feedwater control valve 40.

According to a feature of the invention; the rate of pressurization and depressurization of the signal chamber 40a is controlled by a flow control 112 and a check valve 114. In the illustrated embodiment, the flow control 112 and check valve 114 are internal to the valve 40 but these components may be externally mounted.

The flow control 112 restricts the rate at which fluid entering the signal chamber 40a is applied to the upper diaphragm 74a and thus delays the movement of the diaphragm downwardly and as a consequence delays the engagement of the lower diaphragm 74b with the inlet port 70. In other words, when a signal pressure is delivered to the valve 40 that is sufficient to close the valve 40, the flow control 112 delays or damps the closing of the valve by delaying the application of the full signal pressure to the upper diaphragm 74a. On the other hand, the check valve 114 allows the pressure applied to the upper diaphragm 74a to be extinguished immediately upon termination of pressure in the signal line 110 thus enabling the quick and immediate opening of the valve 40.

As can be seen in FIG. 1, the upper diaphragm 74a of the FW valve 40 which receives permeate pressure has a larger cross section than the lower diaphragm 74b which receives feedwater pressure. As a result, a permeate pressure less than feedwater pressure can effect closing of the diaphragm assembly. The ratio of the surface areas of the upper and lower diaphragms 74a, 74b determines what permeate pressure will effect closing. For example, if the ratio of the upper to lower diaphragm areas is 3:2. A permeate pressure slightly greater than two-thirds of feedwater supply pressure will effect closing of the valve 40 and terminate the communication of feedwater to the bladder 24b and the signal chamber 34a.

When the valve 40 closes, only the region of the diaphragm 74b that overlies the port 70 is exposed to fluid pressure. This area is indicated by the reference character 74b' in FIG. 5. In the preferred and illustrated embodiment, the ratio of the surface area of the upper diaphragm 74a to the area of the region 74b' is approximately 3:1. As a consequence, the permeate pressure in the chamber 40a will hold the valve 40 closed until the permeate pressure drops below ⅓ of the feedwater supply pressure. In short, the valve 40 will close when permeate pressure reaches approximately ⅔ feedwater pressure and will not reopen until permeate pressure drops to approximately ⅓ of feedwater pressure. This "dead band" substantially enhances the stability of the system and inhibits the occurrence of valve chatter, etc.

As permeate continues to be produced by RO cartridge 20, the permeate pressure signal line 110 will see increasing pressure which in turn is applied to the upper diaphragm 74a of the FW control valve 40. When the pressure in the permeate signal line reaches a predetermined pressure (i.e., two-thirds line pressure as determined by the ratio of the surface areas of the upper and lower diaphragms 74a, 74b), the lower diaphragm 74b will seal the inlet port 70 of the FW control valve 40. This will terminate the communication of feedwater to the bladder 24b and the signal pressure chamber 34a of the TP control valve 34.

The feedwater supply line 76 (which feeds both the signal chamber 34a and the bladder 24b via passages 76a, 76b) also communicates to a drain D via a drain passage 120 that includes a flow controller or flow restrictor 122. The drain D also communicates with a lower chamber 34b of the tank pressurization control valve 34 via drain line 126. The feedwater line 76 communicates with the lower chamber 34b of the TP valve 34 via the inlet port 80 which is connected to an auxiliary drain/signal line 128 that includes a flow control or restrictor 130. According to this feature of the invention, the flow control 130 is substantially less restrictive than the flow control 122. The feedwater is delivered to the inlet port 80 of the TP valve 34, which is controlled by the lower diaphragm 84b. When the diaphragm is closed, the feedwater in the line 128 applies an opening force to the diaphragm 84b. When the diaphragm 84b is in the position shown in FIG. 1, feedwater flowing through the flow restrictor 130 enters the lower chamber 34b and is delivered to the drain by a drain line 126. Because the flow control 130 is less restrictive than the flow control 122, feedwater flows to the drain D via the lower chamber 34b much more quickly than it flows through the flow control 122.

As a result of the above described flow configuration, when the feedwater control valve 40 closes and terminates communication of feedwater to the branch supply conduits 76a, 76b, the pressure in these conduits tends to gradually decrease as feedwater flows to drain via the flow control 122. When the pressure in the branch conduits 76a, 76b falls to a predetermined level, sufficient force is supplied by the spring 86 to move the diaphragm 84b upwardly. This opens the inlet port 80 and communicates the drain line 128 (which has the less restrictive flow control) with the drain D thus increasing the rate at which the feedwater pressure in the branch conduits 76a, 76b is reduced.

With the application of feedwater to the bladder 24b terminated, permeate can flow into the tank chamber 24a thus squeezing and shrinking the bladder to a minimum state. The permeate will fill the tank chamber 24a and once filled, the pressure of permeate will begin to increase. This increased permeate pressure will be felt by the upper diaphragm 63a in the RO control valve 30 via the permeate signal line 134. Once the permeate pressure reaches a predetermined pressure with respect to a supply line pressure (as exerted on the lower diaphragm 63b), the diaphragm assembly will be driven downwardly in order to seal the port 62 and terminate the communication of the water supply 10 with the RO cartridge 20. The termination of supply line pressure to the RO cartridge 20 will then enable permeate to flow from the accumulator 52 into the input 20a of the RO cartridge 20 via a flush conduit and check valve 140, 142. The membrane in the RD cartridge 20 is thus flushed with permeate. The system is now in stand-by mode.

In stand-by mode, the check valve 106 maintains pressure in the faucet supply line 98 and the permeate signal line 110. When the faucet 26 is opened to deliver permeate to the user, the pressure in the permeate signal line 110 is immediately depleted. The signal pressure exerted on the upper diaphragm 74a of the FW control valve 40 is also depleted virtually immediately by virtue of the check valve 114. The check valve 114 allows the pressurized fluid communicating with the upper diaphragm 74a to immediately exit the signal chamber 40a. This action immediately reduces or eliminates the closing force on the diaphragm 74a and allows the lower diaphragm 74b to unseat and thus communicate feedwater to the bladder 24b as well as the signal chamber 34a of the tank pressurization control valve 34. The pressurization of the bladder 24b urges permeate out of the storage tank chamber 24a and to the faucet 26.

The drop in permeate pressure when the faucet is opened, also causes the permeate signal pressure in the signal chamber 30a of the RO control valve 30 to also drop. If the signal pressure drops sufficiently, the lower diaphragm 63b will move upwardly, unseating the inlet port 62 and allowing supply water to flow to the RO cartridge 20. Upon opening of the RO control valve 30, the RO cartridge 20 begins making permeate which is delivered to the storage tank compartment 24a and/or the faucet supply conduit 98.

If permeate production is initiated as a result of the opening of the faucet 26, permeate will continue to be produced by the RO cartridge 20 until permeate pressure developed in the storage tank 24 reaches the predetermined level (even when the faucet 26 is turned off). As explained above, the permeate pressure that will effect closure of the RO control valve 30 is determined by the ratio of the effective pressure areas of the upper and lower diaphragms 63a, 63b.

When the faucet is turned off, permeate pressure will build in the permeate signal line 110 and will be communicated to the signal chamber 40a via the flow control 112. Once sufficient signal pressure is exerted on the upper diaphragm 74a, the lower diaphragm 74b will move into sealing contact with the inlet port 70 and terminate the communication of feedwater to the bladder 24b and the TP control valve 34. As explained above, this will ultimately result in the total depressurization of the bladder 24b which will then allow permeate to again fill the entire tank chamber 24a, whereupon permeate production will terminate and the system will be placed in "stand-by" mode.

According to a feature of the invention, the permeate pressure signal that is used to control the valve 40 is a permeate pressure that is seen by the faucet 26. In other words, the pressure signal is taken downstream from the post filter 104. This enhances the stability of the system. In normal operation, the post filter 104 will typically become more restricted with time and as a result there will be a pressure drop across the post filter when the faucet is opened to deliver water. By taking the permeate signal pressure from the line 110 which communicates directly with the faucet, the valve 40 reacts to the permeate pressure seen at the faucet and not at the inlet to the post filter which could be higher if the post filter 104 presents a substantial restriction to the flow of permeate to the faucet. This feature enhances the stability of permeate delivery by the faucet.

As indicated above, the level of permeate pressure that will cause movement of the various diaphragms/piston is determined by the ratio of the effective pressure areas of the upper diaphragm/piston and the lower diaphragm of a given valve. In the illustrated embodiment, when permeate pressure reaches slightly more than two-thirds supply line pressure, permeate production is terminated. According to this embodiment, permeate production is re-instituted upon opening of the RO control valve 30 when permeate pressure falls below one-third supply line pressure.

According to a feature of the invention, the stability of the system is further enhanced by configuring the valves 30 and 40 and associated signal lines so that the RO control valve 30 requires a slightly higher permeate pressure to close as compared to the valve 40. This preferred configuration ensures that the RO control valve 30 does not close before the feedwater control valve 40. If the RO control valve 30 closes first, the source of permeate pressure needed to close the valve 40 is terminated and hence, it will never close. It should be noted that the present invention should not limited to the disclosed ratios or relationships. The above noted relationships can be easily changed by changing the effective of pressure areas of the diaphragms/piston forming part of a given control valve.

Figure 2:
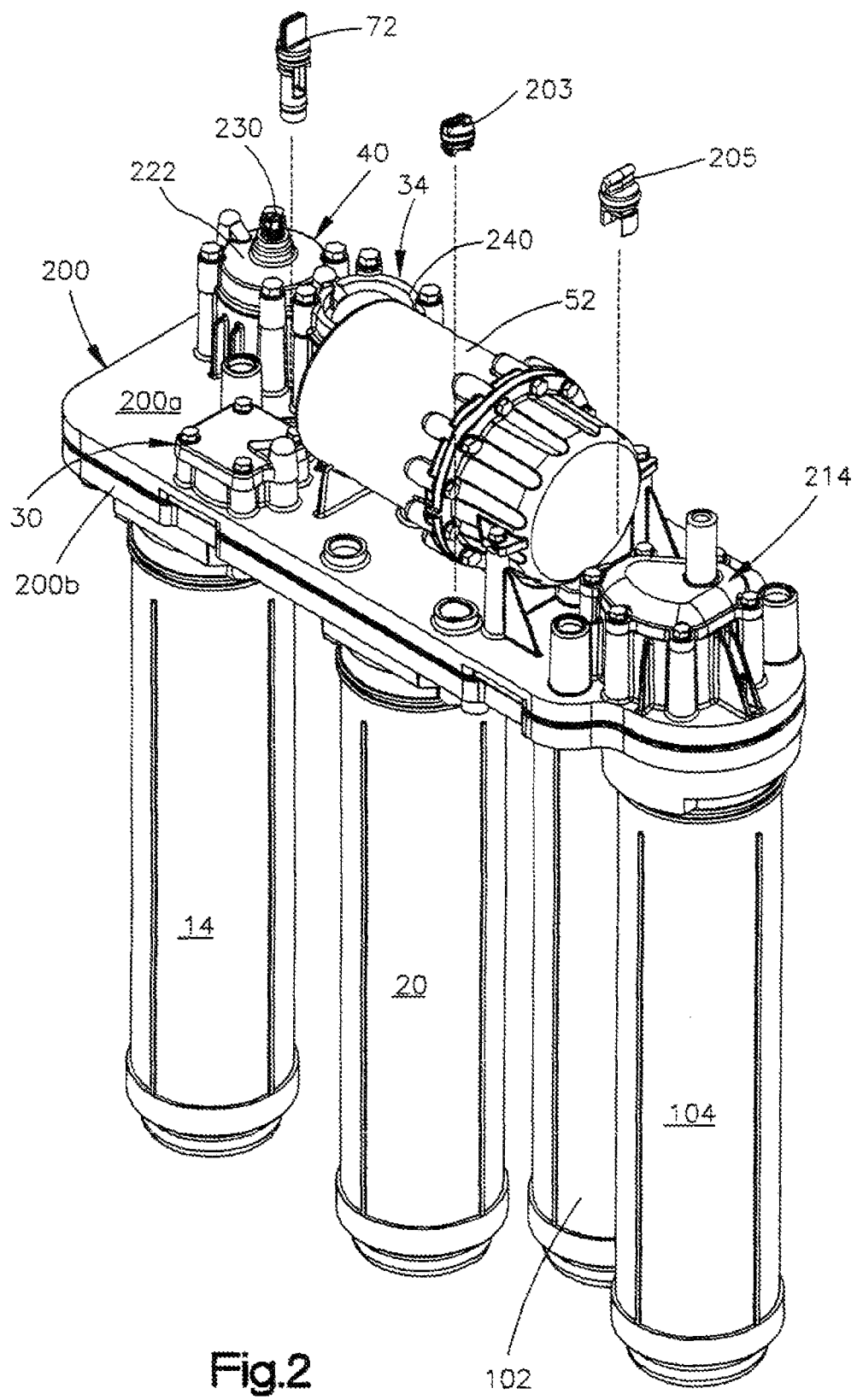
FIG. 2 is a perspective view of a water treatment assembly constructed in accordance with a preferred embodiment of the invention.

FIG. 2 illustrates a water treatment assembly constructed in accordance with a preferred embodiment of the invention, the components of which are schematically shown in FIG. 1. To facilitate the explanation, components in FIG. 2 that correspond to components shown in FIG. 1 will be given the same reference character.

The assembly includes a housing 200 which is preferably molded. In the preferred and illustrated embodiment, the housing 200 includes an upper housing portion 200a and a lower housing portion 200b which are molded separately and then are fused or joined together using a hot plate melt process which is known. Many of the conduits, passages and feedlines shown in FIG. 1 are integrally molded into the housing 200 and are large where it is advantageous to enable high delivery rates. In many cases, portions of the passages, etc. are formed in the housing portions 200a, 200b and are defined fully when the housing portions are joined.

The housing 200 also defines a mounting structure for the various valves, filters and other components shown in FIG. 1

In particular, the housing 200 mounts and at least partially defines the RO control valve 30, the feedwater (FW) control valve 40 and the tank pressure depressurization (TP) control valve 34. The housing 200 also mounts the permeate flush accumulator 52

Referring also to FIG. 3, the housing 200 defines sockets for receiving replaceable filter cartridges. In particular, the housing defines a pre-filter socket 14' for engaging a replaceable pre-filter 14, a socket 20' engageable by a replaceable RO cartridge 20, a socket 104' for a replaceable post filter 104 and sockets 100', 102' for receiving replaceable auxiliary cartridges. An auxiliary cartridge 102 is shown in FIG. 2.

In the preferred embodiment, the sockets shown in FIG. 3 are bayonet type sockets. As is known, the cartridges are inserted into the associated socket and are then rotated a predetermined amount to engage the bayonet structure whereby the cartridge is maintained in position.

It should be noted here, that the socket 100' for the auxiliary cartridge 100 (shown in FIG. 2) contains plug/dispenser device 210 mounted therein rather than a filter. The auxiliary cartridges 100, 102 are optional, and if a customer does not desire auxiliary cartridges, the plug/dispenser device 210 (to be described) is inserted in its place. In FIG. 3 a plug/dispenser device is also shown mounted in the post-filter socket 104'

According to a feature of the invention, several flow control components are easily accessible for service. For example, the concentrate flow control 73, as seen in FIG. 2, is easily removable from the housing 200, for cleaning or replacement. The restricting orifice which forms part of the flow control is molded into the flow control 72, and according to the embodiment illustrated in FIG. 2, is inserted into a bore formed in the housing and is locked and sealed into position by rotating the element 72 a quarter turn or more. Many of the check valves are also easily serviced. For example, check valve 142 is accessed by removing an associated sealing cap 203. After the cap is removed, the check valve 142 can be removed for service, cleaning or replacement. The check valve 106 is accessed by removing an associated cap 205. In the preferred and illustrated embodiment, the flow control 72 and check valve caps, i.e., caps 203 and 205 can be twisted and removed without the need for tools.

The housing 200 also mounts and partially defines a metering device indicated generally by the reference character 214 which monitors the quantity of water treated by the post filter 104. Details of this metering/monitoring device can be found in U.S. Pat. No. 6,428,708, which is owned by the present assignee and is hereby incorporated by reference.

Figure 5:
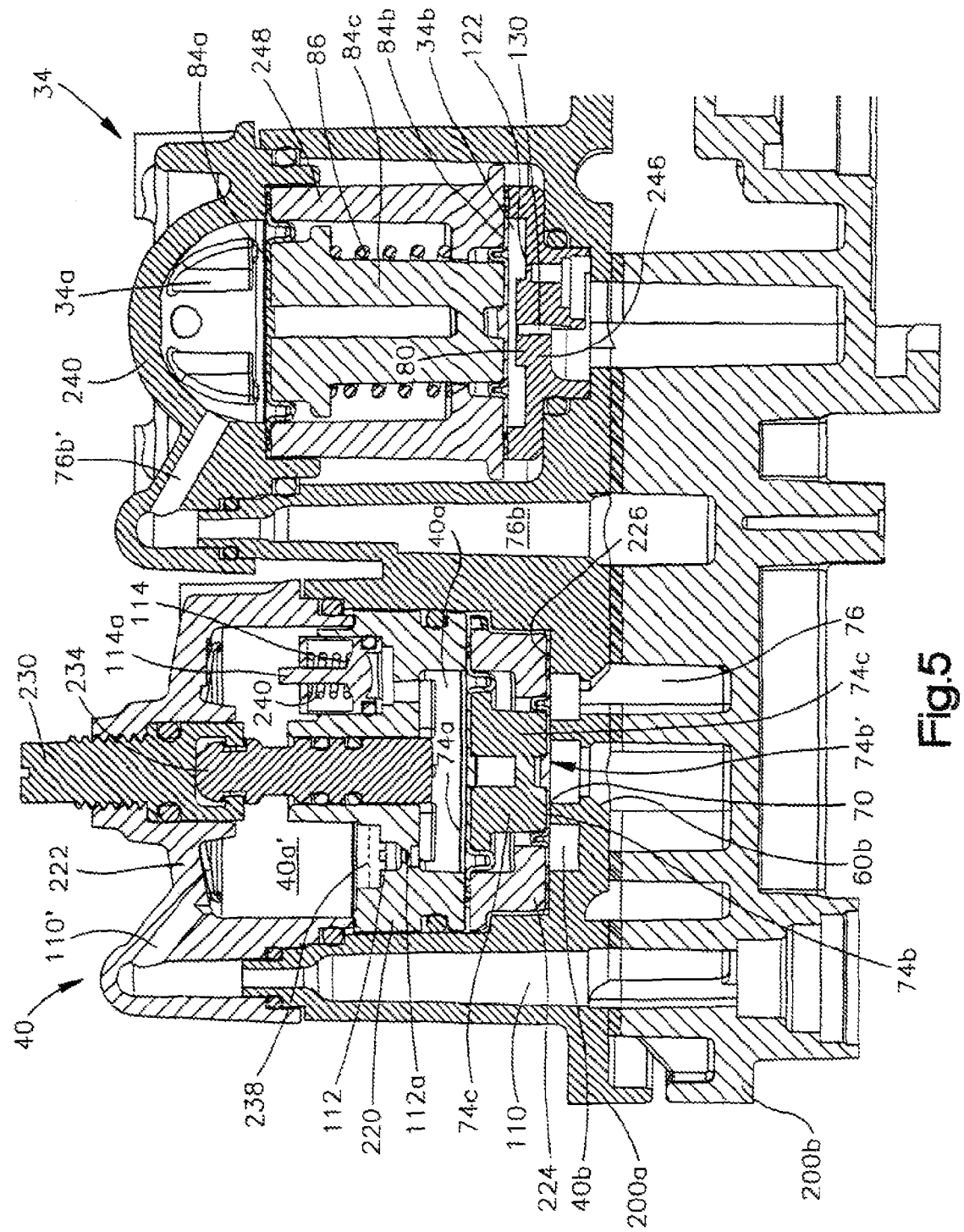
FIG. 5 is a fragmentary, sectional view of the housing shown in FIG. 3.

Referring to FIG. 5, details of an actual FW valve 40 and actual TP valve 34 are illustrated. Turning first to the FW valve 40, the permeate signal line 110 shown in FIG. 1, is at least partly formed by the upper housing 200a. In the actual construction, a short molded, angled passage 110' connects the passage 110 with a receiving chamber 40a' in the FW control valve 40.

The valve 40 includes an annular valving member assembly 220 that is captured between a valve cap 222 and a stepped annular spacer 224. As seen in FIG. 5, the upper diaphragm 74a is sealingly captured between the valving member assembly 220 and the stepped spacer 224 whereas the tower diaphragm 74b is captured between the bottom of the stepped spacer 224 and a step 226 defined by the upper housing 200a. The housing 200a also defines the seat 70 which is engageable by the lower diaphragm 74b. When the lower diaphragm 74b disengages the seat 70 (upon upward movement of the coupling member 74c), fluid in the passage 60b can flow into the lower chamber 40b and is communicated to the feedwater passage 76.

As explained above, the feedwater control valve 40 controls the communication of feedwater to the tank 24 in order to produce a driving force to force permeate from the chamber 24a. In operation, when the lower diaphragm 74b moves upwardly and disengages the seat 70, feedwater is communicated to the bladder chamber 24a of the tank 24.

According to a feature of the invention and referring also to FIG. 1, a gas pressure biased or air charged tank (shown in phantom in FIG. 1) 24' may be substituted for the feedwater biased tank 24. When a customer chooses a gas pressure biased tank to store permeate, the feedwater control valve 40 may be disabled to inhibit the communication of feedwater to the passage 76. According to the invention, this achieved by mechanically maintaining the engagement of the lower diaphragm 74b with the seat 70. As seen best in FIG. 5, the valve cap 222 threadedly mounts an adjustment screw 230 that is loosely coupled to a plunger 234. When the adjustment screw 230 is rotated to produce downward movement in the adjustment screw, the plunger 234 is eventually moved into abutting contact with the upper diaphragm 74a which then urges the coupling member/74c downwardly. Upon sufficient downward movement of the plunger 234 the coupling member 74c contacts the lower diaphragm 74b and urges it into sealing contact with the seat 70 thereby permanently isolating the feed line 60b from the feed line 76. This prevents the communication of feedwater to the feedwater conduit 76a (shown in FIG. 1). In addition, the line 76 may be plugged by a suitable plug P.

The valving member assembly 220 defines the flow restrictor 112 which may be formed by an appropriately sized orifice 112a. The flow restrictor 112 may also include a screen 238 to inhibit the entry of contaminants that would otherwise block the orifice 112a.

The valving member assembly 220 also mounts the check valve 114 which includes a check element 114a biased toward its closed position by a spring 240.

As seen in FIG. 5, suitable O-rings are used to seal the adjustment member 230, the plunger 234 and the valving member assembly 220 to inhibit fluid leakage.

The tank depressurization control valve 34 includes a cap 240 which defines a short angled passage 76a that communicates the passage 76a (also shown in FIG. 1) with the signal chamber 34a. The chamber 34b is defined by a lower surface of the lower diaphragm 84b and an upper surface of an annular insert 246. The insert is held in a stepped recess defined by the upper housing 200a and is sealed thereto by an O-ring. The insert 246 also defines the valve seat 80 which is engageable by the lower diaphragm 84b. It also defines the flow restriction 122 and the flow restrictor 130 which are formed by orifices having predetermined sizes.

The lower diaphragm 34b is captured between the annular insert 246 and a tubular spacer 248. The upper diaphragm 84a is captured between the tubular spacer 248 and the top cover 240.

Figure 6:
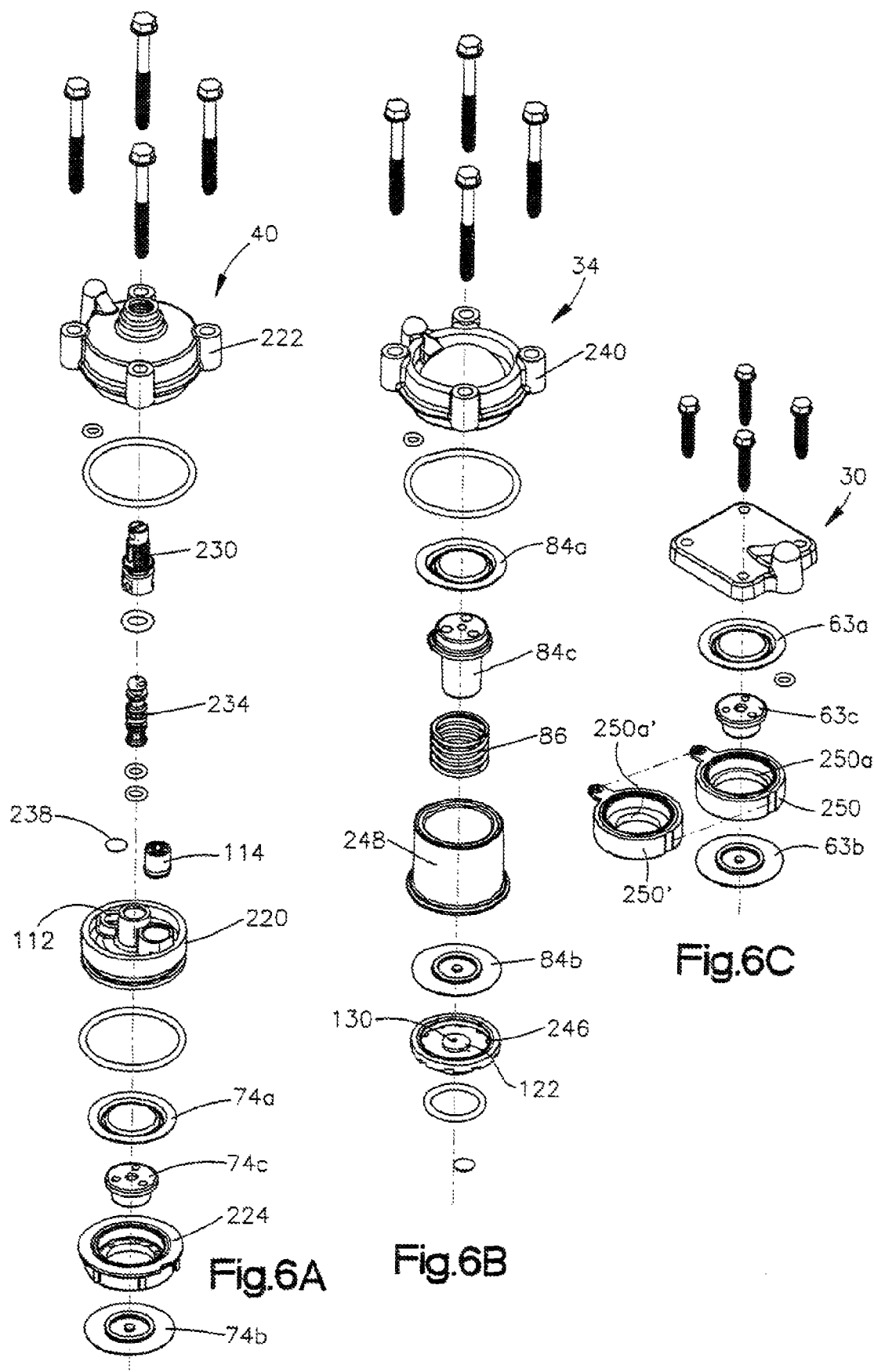
FIG. 6A is an exploded view of a feedwater control valve constructed in accordance with a preferred embodiment of the invention.
FIG. 6B is an exploded view of a tank depressurization control valve constructed in accordance with a preferred embodiment of the invention.
FIG. 6C is an exploded view of an RO control valve constructed in accordance with a preferred embodiment of the invention.

FIGS. 6A, 6B and 6C are exploded views of the feedwater control valve 40, the tank depressurization control valve 34 and the RO control valve 30. These figures illustrate the components that comprise the actual valves 30, 34, 40 that are shown in FIGS. 1-5.

To facilitate understanding, components shown in FIGS. 6A, 6B and 6C which correspond to components shown in FIGS. 1-5 are given the same reference characters. The unnumbered annular shaped components shown in these figures are seals and/or O-rings that are used to seal the components to each other or to other housing components.

As discussed above, the feedwater control valve 40 includes a step spacer 224 that is positioned between the upper and lower diaphragms 74a, 74b. This step spacer, and in particular its upper and lower inside diameters, define the effective pressure areas for the upper and lower diaphragms, respectively.

As seen in FIG. 6A, RO control valve 30 also includes a stepped spacer 250 positioned between the upper and lower diaphragms 63a, 63b. This stepped spacer 250 includes a lower inwardly extending step 250a which defines a predetermined inside diameter that is smaller than an inside diameter defined by an upper portion of the spacer 250. Like the spacer 224 in the valve 40, the spacer 250 defines the effective pressure areas of the lower and lower diaphragms 63a, 63b. As explained above, the upper diaphragm receives permeate pressure through the signal line 134. The undersurface of the diaphragm 60b receives source pressure. Because the upper diaphragm has a larger effective pressure area due to the larger inside diameter of the upper portion of the spacer 250, a permeate pressure lower than source water pressure will be sufficient to drive the diaphragm 63b downwardly into contact with the seat 62 whereby the communication of source water to the RO unit 20 is terminated. The ratio of the effective pressure areas defined by the diaphragm 63a and 63b determines the ratio of permeate pressure to source pressure that will effect closure of the valve.

In accordance with the invention, differently sized spacers 250 can be substituted to change the permeate pressure level that will effect closure of the valve. For example, in some applications, especially ones that use a gas charged storage tank 24' (shown schematically in FIG. 1), it may be desirable that a lower permeate pressure be sufficient to close the RO control valve 30. This is achieved by substituting the spacer 250' for the spacer 250. As seen in FIG. 6C, the spacer 250' includes an inwardly depending step 250a' that defines an inside diameter that is smaller than the inside diameter defined by the alternate spacer 250. The spacer 250 in effect reduces the effective pressure area of the lower diaphragm 63b. As a result, a given level of source pressure applies a reduced force on the valve, thus enabling a lower permeate pressure to effect downward movement of the lower diaphragm 63b into closure contact with seat 62 (shown in FIG. 1). As indicated above, the ratio between the permeate pressure that can effect closure and the source pressure is determined by the ratio of the inside diameters defined by the stepped portion 250a and the inside diameter of the upper portion of the spacer.

Figure 7:
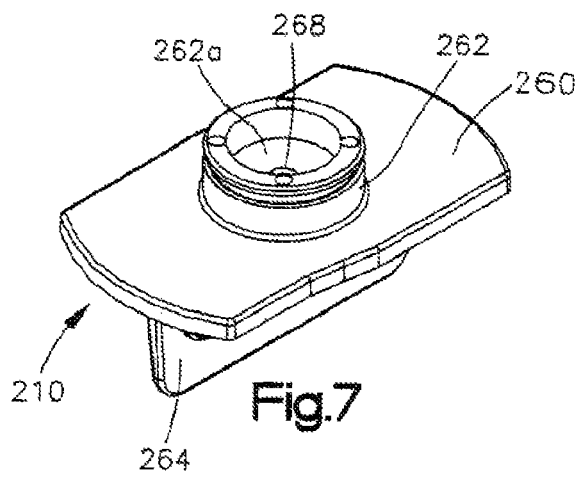
FIG. 7 is a perspective view of a plug/dispenser device constructed in accordance with a preferred embodiment of the invention.

FIGS. 7-10 illustrate other features of the present invention. FIG. 7 illustrates the details of the plug/dispenser 210 which was discussed in connection with FIGS. 3 and 4. The device 210 serves several purposes. It can serve as a plug to block a given socket if a particular filter/cartridge is not to be installed. As seen in FIG. 3, the member 210 is used to plug the socket for the auxiliary filter 100 (shown in FIG. 1). The member 210 includes a flange 260 which is engageable by the socket structure, i.e., socket 100 in order to maintain its position. The member also includes an annular, projection 262 which defines a reservoir 262a. The projection 262 is sealingly receivable by a given socket such as socket 100' and establishes fluid communication between the reservoir 62a and the housing 200. The reservoir 262a may be filled with a desired solution or substance (granular or pelletized) such as a disinfectant solution or a cleaning solution. The member 210 can then be installed into the housing 200, whereupon the solution/substance carried in the reservoir 262a can be used to flush, cleanse, sanitize or disinfect the overall system. The member 210 includes a depending flange 264 which is can be grasped by an operator to facilitate installation and removal of the member 210 from a given socket.

As indicated above, the housing 200 mounts a metering device indicated generally by the reference character 214. In the preferred embodiment, the metering device is of the type disclosed in U.S. Pat. No. 6,428,708. As seen in FIG. 4, the metering device 214 includes a plunger 266 which seals the port 267 when an associated cartridge is removed. According to a feature of the invention, the plug/dispenser 210 includes a projection 268 for lifting the plunger 267 off its associated seat, when the member 210 is installed into the socket 104. By lifting the plunger 267, fluid in the reservoir 262a is communicated to appropriate passages in the metering device 214.

Figure 8:
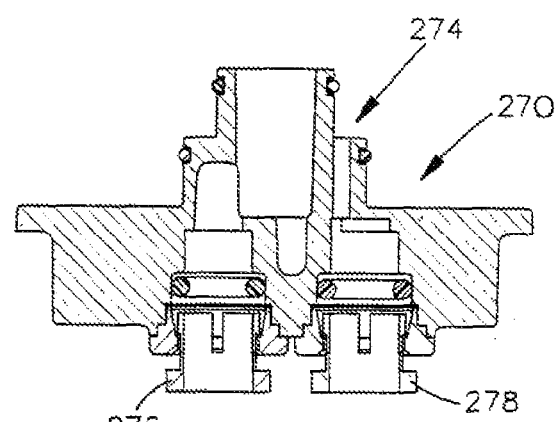
FIG. 8 is a sectional view of a filter adaptor forming part of the present invention.
Figure 9:
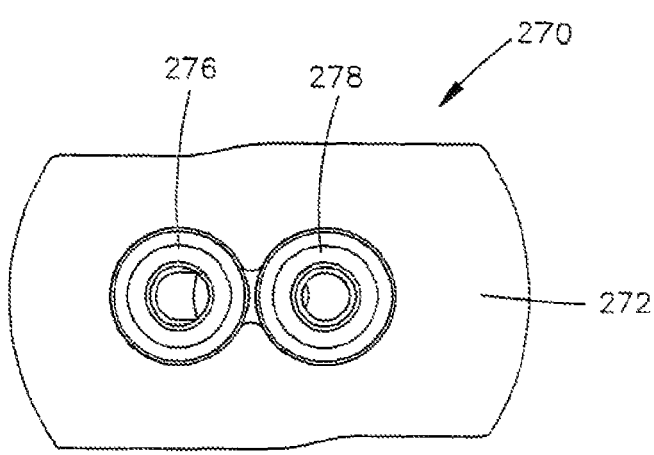
FIG. 9 is a bottom view of the adaptor shown in FIG. 8.

FIGS. 8 and 9 illustrate an adaptor 270 which can be installed in either or both auxiliary cartridge sockets 100', 102 in order to add additional auxiliary filters to the system. The adaptor 270 includes an upper flange 272 which is engageable with any of the sockets shown in FIG. 3 including but limited to sockets 100, 102. The adaptor 270 includes a projection 274 which establishes fluid communication with appropriate passages in the housing 200 and provides fluid communication to inlet and outlet ports 276, 278. These outlet ports are configured to receive conduits from other filters, tanks which, through the adaptor, are fluidly connected to the system so that these auxiliary filters, tanks, etc. form part of the system.

Figure 10:
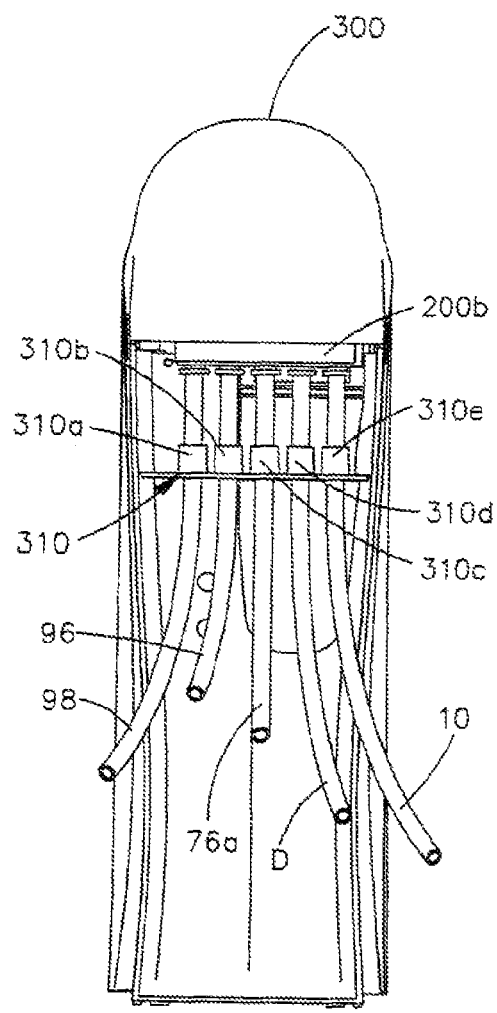
FIG. 10 is a rear view of the water treatment assembly shown in FIG. 2, mounted within an enclosure constructed in accordance with a preferred embodiment of the invention.

FIG. 10 illustrates an assembled system in which the housing 200 is mounted within an enclosure 300. Additional details of the enclosure can be seen in co-pending design application serial no. 29/285,266, filed Mar. 26, 2007, owned by the present assignee and hereby incorporated by reference. According to the invention, the enclosure, in combination with the housing 200b, provides a strain relief for the conduits that are used to connect the housing to the household water supply 10, faucet 26 and tank 24. The enclosure 300 includes a hose support 310 which defines short, tubular segments 310a-310e, through which the conduits 98, 96, 78a, D, 10, respectively are fed prior to connection to the appropriate ports defined by the lower housing 200b. In general, the conduits are connected to the ports on the housing 200b by known quick disconnect fittings. The hose support 310, defined by the enclosure 300, support the conduits and isolate forces exerted on the conduits from the fittings that couple the conduits to the housing 200b. As a result of this arrangement, if a force is applied to a given conduit (such as a pulling force), most of this force is borne by the conduit support 310. In particular, the force is applied to the associated tubular segment and is not applied, or a reduced amount is applied, to the actual fitting at the housing 200b. This stress relief should reduce the potential for conduit failures and/or leaks Although the invention has been described with a certain degree of particularity, it should be understood that those skilled in the art can make various changes to it without departing from the spirit or scope of the invention as hereinafter claimed.

Having described the invention, the following is claimed:

1. A water treatment system comprising:
   a) a reverse osmosis module having an input for source water to be treated, a permeate output and a concentrate output;
   b) a reverse osmosis control valve for controlling the communication of the source water with said reverse osmosis module input;
   c) a feedwater biased storage tank for storing permeate produced by said reverse osmosis module;
   d) a feedwater control valve for controlling the communication of said source of water to be treated with a feedwater chamber located in said storage tank and formed at least partially by an elastomeric member;
   e) a tank pressurization control valve for controlling the opening and closing of said feedwater control valve;
   f) a flow control for restricting the flow of a signal pressure to a signal pressure chamber in said feedwater control valve, said restrictor for reducing the rate at which a fluid generated force is applied to a valve operating member forming part of said feedwater control valve and,
   g) a check valve configured to be in a parallel relationship with said restrictor which allows a fluid generated force on said valve operating member to be released substantially immediately when said signal pressure is terminated.

2. The water treatment system of claim 1 wherein said feedwater control valve includes an operating member accessible from outside the valve which is operated to mechanically close said feedwater control valve to terminate the communication of said source of water to be treated with said storage tank.

3. The water treatment system of claim 2 wherein said feedwater control valve, when closed by said operating member enables a gas charged storage tank to be substituted for said feedwater biased storage tank.

4. The water treatment system of claim 1 including a conduit support for isolating forces applied to conduits connected to said water treatment system.

5. The water treatment system of claim 1 further comprising a plurality of sockets for receiving removable filter modules.

6. The water treatment system of claim 5 further comprising a reservoir/plug which is receivable by at least one of said sockets whereby a substance can be introduced into said water treatment system for cleaning said system.

7. The water treatment system of claim 5 further comprising an adaptor that is receivable by at least one of said sockets whereby additional modules can be fluidly connected to said water treatment system.

8. The water treatment system of claim 1 comprising:
a) a plurality of sockets for receiving removable filter modules: and
b) a plug/dispenser which is receivable by at least one of said sockets, said plug/dispenser serving to block a socket to which a filter module is not attached and defining a substance receiving reservoir whereby said substance can be introduced into said water treatment system for cleaning said system.

9. The water treatment system of claim 8 further comprising an adaptor that is receivable by at least one of said sockets whereby additional water treatment modules can be fluidly connected to said water treatment system.

10. The water treatment system of claim 1 further comprising;
a housing enclosing components of said water treatment system and including a strain relief conduit support for isolating forces applied to flexible conduits connected to said water treatment system components, said conduit support including tubular segments through which said flexible conduits extend to maintain a predetermined orientation of said conduits with respect to said water treatment system components they are connected such that forces applied to said flexible conduits are substantially inhibited from transmission to connections with said system components.

11. A water treatment system comprising:
a) a reverse osmosis module having an input for source water to be treated, a permeate output and a concentrate output;
b) a reverse osmosis control valve for controlling the communication of the source water with said reverse osmosis module input;
c) a feedwater biased storage tank for storing permeate produced by said reverse osmosis module;
d) a feedwater control valve for controlling the communication of said source of water to be treated with a feedwater chamber located in said storage tank and formed at least partially by an elastomeric member;
e) a tank pressurization control valve for controlling the opening and closing of said feedwater control valve;
f) said tank pressurization control valve including a receiving chamber communicating with a drain, said tank pressurization; control valve further including a diaphragm controlled inlet arranged such that when said inlet is not engaged by a diaphragm, it communicates with said receiving chamber and when said diaphragm sealingly engages said inlet, communication of said inlet with said receiving chamber is terminated;
g) a first flow passage including a first restrictor communicating said feedwater chamber in said storage tank with said drain;
h) a second flow passage including a second flow restrictor communicating said feedwater chamber in said storage tank with said inlet of said tank pressurization control valve and wherein the flow restriction posed by said first flow restrictor is substantially greater than the flow restriction posed by said second flow restrictor such that when said diaphragm disengages said inlet, the flow of feedwater to drain via the second passage is substantially greater than the flow of feedwater to the drain via the first passage.

12. The apparatus of claim 11, wherein said first passage provides a slight leakage of feedwater to the drain throughout the operation of the water treatment system.

13. The water treatment system of claim 11, wherein said feedwater control valve includes an operating member that can be manually operated to close said feedwater control valve whereby enabling a gas charged storage tank to be substituted for said feedwater biased storage tank.

14. The water treatment system of claim 11 further including an accumulator for storing permeate from the reverse osmosis module, said permeate stored in said accumulator being used to flush a membrane in the reverse osmosis module at the conclusion of a purifying cycle.

15. The water treatment system of claim 14 wherein said accumulator is spring biased.

16. A method for purifying water, comprising the steps of:
a) providing a reverse osmosis module having an input for source water to be treated, a permeate output and a concentrate output;
b) providing a reverse osmosis control valve for controlling the communication of the source water with the reverse osmosis module;
c) storing permeate produced by the reverse osmosis module in a feedwater biased storage tank that includes a feedwater chamber for urging permeate out of the storage tank when the feedwater chamber is pressurized;
d) monitoring the pressure of permeate at a dispensing device with a feedwater control valve;
e) delaying the application of a signal pressure related to the pressure of permeate at the dispensing device to the feedwater control valve in order to slow closure of said feedwater control valve;
f) allowing substantially unrestricted flow out of a signal chamber in said feedwater control valve to allow substantial and immediate opening of said feedwater control valve when the signal pressure is reduced;
g) allowing feedwater in said feedwater chamber to leak to a drain through a flow restrictor whereby substantially complete depressurization of said feedwater chamber is insured when permeate is being produced by said reverse osmosis module.

17. The method of claim 16 further comprising the step of accumulating permeate in an accumulator which is used to flush the reverse osmosis module at the conclusion of a purifying cycle.

18. The method of claim 17 further comprising the steps of communicating permeate from said accumulator to an input of said reverse osmosis module when said reverse osmosis control valve terminates the communication of the source water with the reverse osmosis module.

19. The method of claim 16 further comprising the step of monitoring permeate pressure at said dispensing device and, upon sensing a predetermined reduction of pressure at said dispensing device, communicating feedwater to said feedwater chamber in order to create a force urging permeate out of said storage tank.

* * * * *